United States Patent
Zecher et al.

[15] 3,669,937

[45] June 13, 1972

[54] PROCESS FOR THE PRODUCTION OF POLYIMIDES

[72] Inventors: Wilfried Zecher, Cologne-Stammheim; Rudolf Merten, Leverkusen, both of Germany

[73] Assignee: Farbenfabriken Bayer Aktiengesellschaft, Leverkusen, Germany

[22] Filed: March 26, 1969

[21] Appl. No.: 810,787

[30] Foreign Application Priority Data

April 5, 1968 Germany.....................P 17 70 137.0

[52] U.S. Cl..................260/77.5 R, 117/161 KP, 252/63.7, 260/18 TN, 260/33.4 UR, 260/47 CP, 260/77.5 C, 260/78 TF
[51] Int. Cl.........................................................C08g 22/02
[58] Field of Search.............260/77.5, 78 TF, 77.5 C, 47 CZ

[56] References Cited

UNITED STATES PATENTS

| | | | |
|---|---|---|---|
| 3,300,420 | 1/1967 | Frey | 260/2.5 |
| 3,314,923 | 4/1967 | Muller et al. | 260/78 |
| 3,317,480 | 5/1967 | Fetscher et al. | 260/77.5 |
| 3,489,696 | 1/1970 | Miller | 260/2.5 |
| 3,493,540 | 2/1970 | Muller et al. | 260/47 |

FOREIGN PATENTS OR APPLICATIONS 672,985  3/1966  Belgium.................260/47

Primary Examiner—Donald E. Czaja
Assistant Examiner—M. I. Marquis
Attorney—Plumley & Tyner

[57] ABSTRACT

Process for the production of polyimides by reaction of a urea and a cyclic dicarboxylic acid anhydride containing at least one additional functional group capable of condensation or addition.

5 Claims, No Drawings

PROCESS FOR THE PRODUCTION OF POLYIMIDES

This invention relates to a process for the production of high molecular weight polyimides by reacting ureas with cyclic dicarboxylic acid anhydrides containing at least one additional functional group.

It is already known that tetracarboxylic acids, or anhydrides thereof, in which two carboxyl groups are situated in the o-position relative to one another, can be condensed with diamines to form polyimides. Many polyimides show an outstanding resistance to high temperatures and are therefore used, for example, as wire enamels and films for electrical insulating purposes. Unfortunately, the temperature-resistant polyimides are insoluble in most organic solvents, with the result that they usually have to be produced in two stages (c.f. DAS 1,202,981). It is standard practice to operate with solutions of polyamide polycarboxylic acids in strongly polar solvents, whose practical application unfortunately involves considerable difficulties, for example because the insoluble polyimides are precipitated through premature cyclization or are split up into low molecular weight fragments by the water which is evolved during this reaction.

It is an object of this invention to provide a process for the production of polyimides which avoids the disadvantages mentioned above.

This is achieved by a process for the production of high molecular weight polyimides which comprises reacting a urea and a cyclic dicarboxylic acid anhydride containing at least one additional functional group capable of condensation or addition, said reacting being effected at a temperature of from $-20°$ to $+450°C$.

The reaction is optionally carried out in the presence of a solvent. The process is preferably carried out at a temperature from $+20°$ to $+350°C$.

In the process according to the invention, the polyamines conventionally used in the production of polyimides, being substances which are sensitive to oxidation and whose purification involves difficulties and considerable losses, are replaced by ureas and polyureas, which are much more stable. In general, the imide group is developed only at relatively high temperatures, guaranteeing stability in storage, for example of lacquer solutions. One considerable advantage so far as practical application is concerned is that condensation can be carried out in several stages without any premature further reaction after the first stage has been completed. Thus, solutions which are distinguished by their high solids content and relatively low viscosities can be obtained from the low molecular weight condensation products obtained in the first stage of the reaction. These solutions are then applied and condensation continued to completion on the articles to be provided with a coating.

Any N,N'-disubstituted ureas may be used as the ureas for the purposes of this invention. The following are mentioned by way of example:

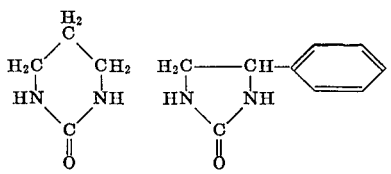

The ureas may, however, also contain other functional groups capable of polycondensation or polyaddition reactions, such as hydroxyl groups, carboxyl groups, dicarboxylic anhydride groups, carboxylic acid ester groups or isocyanate groups. Examples of such ureas include:

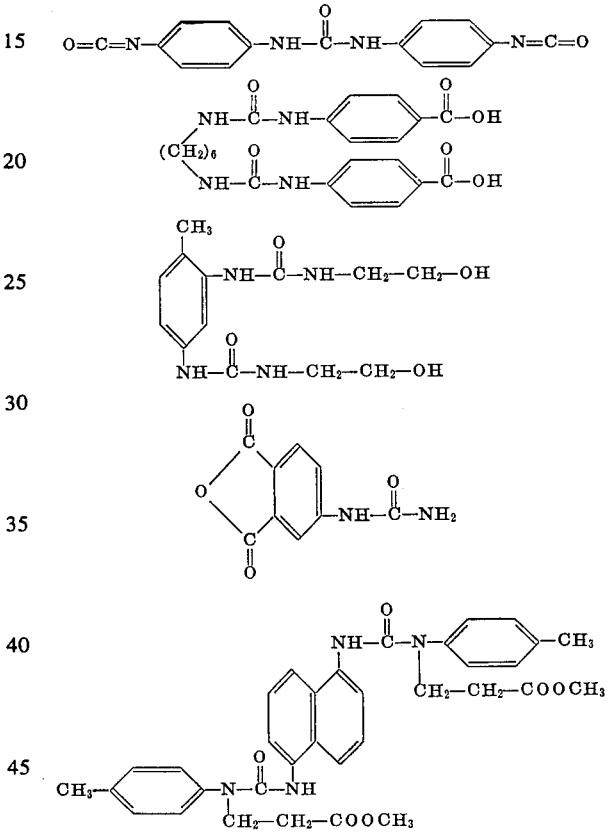

It is preferred, however, to use as ureas polyureas or polyurea urethanes that can be obtained by reacting diisocyanates with diamines or aminoalcohols or with water. Examples of these polyureas, which may also contain ester groups, ether groups, carbamic acid ester groups, acid amide groups, acid imide groups and hydantoin groups, include:

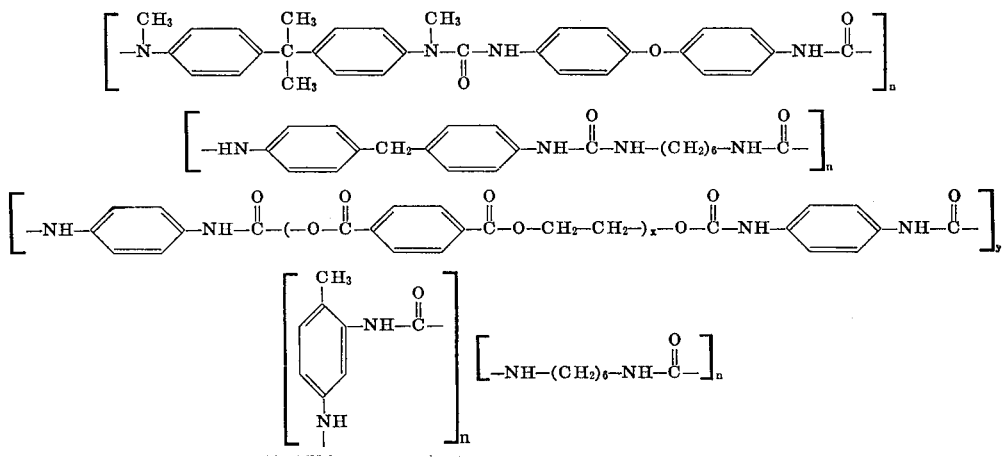

Trisubstituted ureas are also suitable, for example

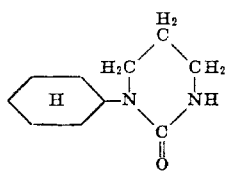

In the context of this invention ureas are to be understood to include thioureas and guanidines or compounds which, like biurets for example, are converted into ureas during the reaction. The ureas used as starting materials in accordance with the invention may be prepared by known methodes, for example by reacting amines with isocyanates or by condensing amines with phosgene, urea or carbonic acid chlorides. Another alternative is to add water or substances which split off water to isocyanates. Water or an amine may even be used in less than the stoichiometrically necessary quantity, because water or amine evolved during the condensation reaction with acid anhydrides again lead to the formation of ureas by reaction with isocyanates groups. The ureas may either be used per se or alternatively may be prepared in situ in the reaction medium itself.

In the context of this invention, cyclic dicarboxylic acid anhydrides containing at least one additional group capable of condensation include any dicarboxylic acid anhydrides which, in addition to a cyclic dicarboxylic acid anhydride group, contain either (a) one or two additional cyclic dicarboxylic acid anhydride groups or (b) one or two other functional groups capable of condensation or addition, for example carboxylic acid groups and carboxylic acid ester groups. To group (a) belong for example the following compounds:

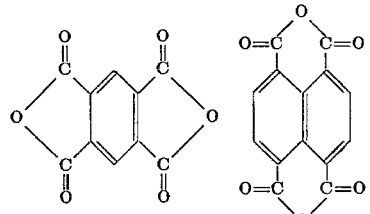

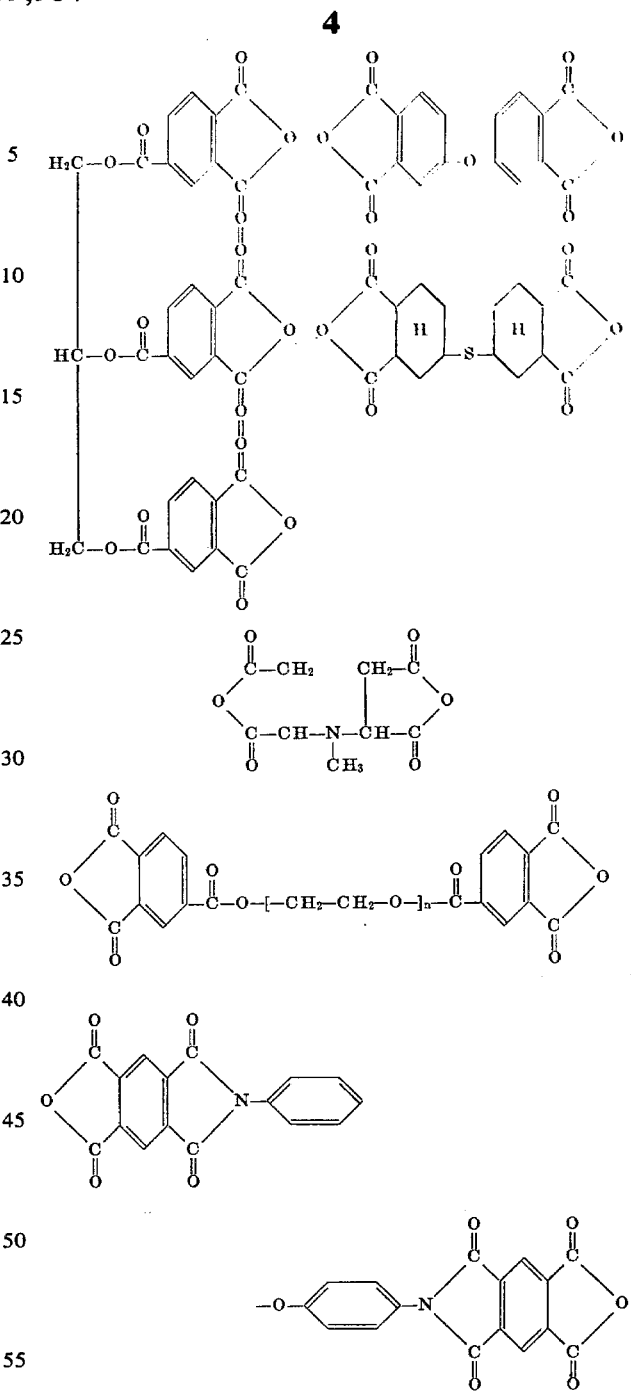

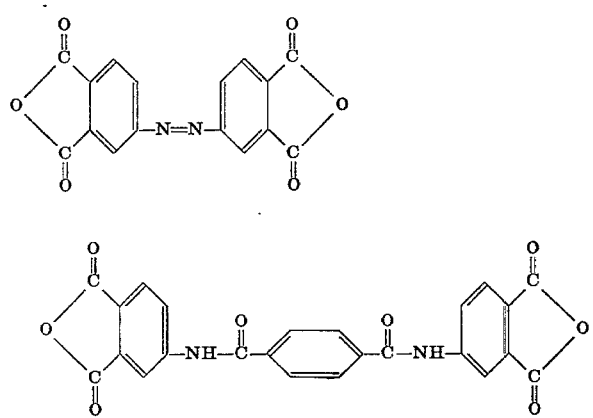

Group (b) includes for example the following compounds:

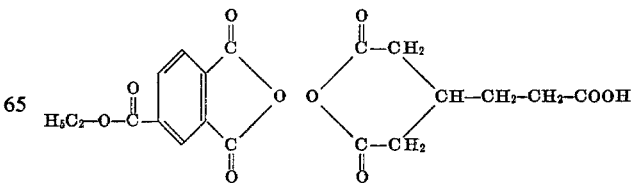

However, it is preferred to use pyromellitic acid anhydride, trimellitic acid and azo-bis-4,4'-phthalic acid anhydride.

Instead of compounds containing dicarboxylic acid anhydride groups, it is also possible to use compounds which, like o-dicarboxylic acids or their phenyl esters, for example, can be converted into compounds containing dicarboxylic acid anhydride groups.

The reaction according to the invention is illustrated by the following general reaction scheme:

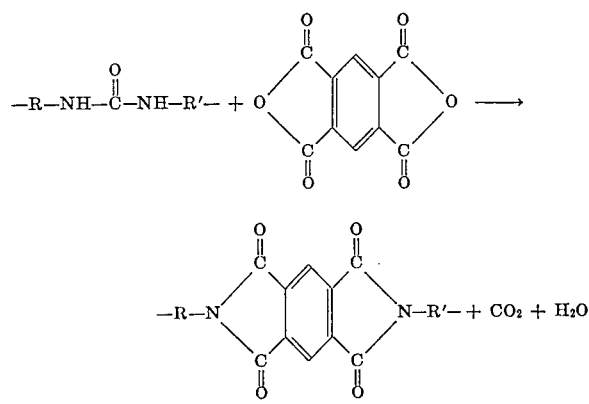

When at least bis-functional ureas and bis-functional acid anhydrides are used as the starting materials, the monomers or oligmers are linked together to form the high molecular weight compound simply through imide groups. It is also possible, however, to synthesize the high molecular weight compounds from one monofunctional and one bis-functional component or from two monofunctional components, which in this instance must have at least one other group capable of condensation or addition.

Thus, polyamide imides are obtained, for example, from the polyurea of diphenyl methane

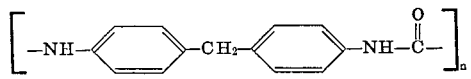

and trimellitic acid anhydride.

Another method of synthesizing high molecular weight compounds from monofunctional ureas and acid anhydrides with a second reactive group is to add other suitable polyfunctional substances, for example diamines, polyesters or polyethers with terminal hydroxy or acid groups, diols, triols, polycarboxylic acids and polyisocyanates. Thus, a polyamido-imido ester can be obtained by the process according to the invention from trimellitic acid anhydride, hexane diol and the polyurea of 4,4'-diisocyanato diphenyl methane and hexamethylene diamine.

The reaction according to the invention is usually carried out in organic solvents. Suitable organic solvents include hydrocarbons, halogenated hydrocarbons, phenols, esters, ketones, ethers, substituted amines, sulphoxide and sulphones, for example xylene, o-dichlorobenzene, phenol, cresol, acetophenone, ethylene glycol monomethyl ether acetate, N-methyl pyrrolidone, dimethyl formamide, dimethyl sulphoxide, dimethyl sulphone and mixtures thereof.

It is preferred to use phenols, for example cresol.

To carry out the process according to the invention, the reaction components are kept for periods ranging from a few minutes up to several hours at temperatures of from 0° to 450°C and preferably at temperatures from 20° to 350°C, optionally in the presence of solvents. In some instances, it is of advantage to carry out the reaction in several stages. An adduct or condensate may be prepared in a first stage and subsequently converted at elevated temperatures into the high molecular weight polyimide, optionally accompanied by chain extension or by crosslinking. In some instances it is of advantage to carry out the reaction in the presence of an inert protective gas, such as nitrogen or argon.

To obtain high molecular weight products, the reaction components are generally used in equivalent quantities, although deviations from the stoichiometric ratios are also possible. Occasionally it can be of advantage to accelerate the reaction by the addition of suitable catalysts, for example zinc chloride, stannous chloride, ferric chloride, triethylene diamine, zinc octoate, dialkyl tin diacylates, titanium tetrabutylate and lead oxide.

It is possible by the process according to the invention to obtain polyimides which are distinguished by their outstanding resistance to high temperatures, and which are suitable for use as lacquers, films and shaped articles. Their properties may be varied within wide limits to satisfy the requirements of the various fields in which they are used, by the addition of fillers, pigments and low molecular weight or high molecular weight components, for example for the production of wire enamels by admixture with terephthalic acid polyesters.

The following examples are to further illustrate the invention without limiting it.

The cresol used as solvents in the examples is an isomer mixture of the kind obtained in large-scale practice.

EXAMPLE 1

25.0 g of diphenylmethane-4,4'-diisocyanate and 19.8 g. of 4,4'-diamino diphenyl methane are stirred for 1 hour at 100°C into 168 g of cresol. 38.4 g of trimellitic acid anhydride are then introduced and the resulting mixture is heated for 8 hours to 190° to 200°C. The mixture is then stirred at this temperature until no more carbon dioxide escapes, resulting in the formation of a viscous solution which is stoved first at 200°C and then at 300°C to give a clear brown lacquer film. The infra-red spectrum shows the bands characteristic of the amide group at 1,660 cm$^{-1}$, and the bands characteristic of the imide group at 1,713 and 1,775 cm$^{-1}$.

EXAMPLE 2

28.4 g of the polyurea obtained from 16.8 of hexamethylene diisocyanate and 11.6 g of hexamethylene diamine, are heated with 43.6 g of pyromellitic acid dianhydride in 144 g of cresol, first for 5 hours at 150°C and then for 6 hours at 195°C. Acetonitrile is then added to the reaction mixture, which is suction filtered, leaving the polyimide in the form of a yellow powder whose infra-red spectrum shows the bands typical of imides at 1,710 and 1,764 cm$^{-1}$.

| | | C | H | N |
|---|---|---|---|---|
| $(C_{16}H_{14}N_2O_4)_n$ | $(298.3)_n$ | | | |
| Calculated: | | 64.4% | 4.7% | 9.4% |
| Found : | | 64.6% | 4.9% | 9.1% |

EXAMPLE 3

30.5 g of aminoethanol and 125 g of diphenylmethane-4,4'-diisocyanate are stirred for 1 hour at 90°C into 250 g of cresol. 192 g of trimellitic acid anhydride are then introduced and the reaction mixture is slowly heated for 7 hours to 195°C. It is then stirred for 8 hours at this temperature, leaving a viscous solution of the condensation product which is stoved at 200° and 280°C, giving clear hard lacquer films.

EXAMPLE 4

43.6 g of pyromellitic acid dianhydride are introduced into a suspension of the urea formed from 25.0 g. of diphenyl methane-4,4'-diisocyanate and 19.8 g of 4,4'-diaminodiphenylmethane. The temperature is then increased to 195°C over a period of several hours and the reaction mixture stirred at this temperature for 8 hours. Acetonitrile is then added and the polyamide, in the form of a yellow powder, is suction filtered, washed with acetonitrile and dried.

| | | C | H | N |
|---|---|---|---|---|
| $(C_{23}H_{12}N_2O_4)_n$ | $(380.4)_n$ | | | |
| Calculated: | | 72.6% | 3.2% | 7.4% |
| Found : | | 72.3% | 3.6% | 7.2% |

EXAMPLE 5

25.0 g of diphenylmethane-4,4'-diisocyanate and 11.6 g. of hexamethylene diamine are heated for 1 hour to 90°–100°C. Following the addition of 64.4 g of azo-bis-4,4'-phthalic acid anhydride, the reaction mixture is slowly heated and then stirred for 7 hours at 170°C. and for 8 hours at 200°C. A brown viscous solution is obtained which is coated on to glass and metal plates and stoved at 200° and 300°C to form clear hard lacquer films.

EXAMPLE 6

The urea of 16.8 g of hexamethylene diisocyanate and 11.6 g of hexamethylene diamine is heated with 38.4 g. of trimellitic acid anhydride in 134 g of cresol, first for 7 hours at 170°C and then for 5 hours at 195°C. The solution of the condensation product is then cast into films, in which it is condensed to completion at 200° and 300°C. accompanied by evaporation of the solvent. Elastic non-tearing films are obtained.

What We claim is:

1. The process for the production of high molecular weight polyimides which comprises
   1. reacting an N,N'-disubstituted urea or an N,N'-trisubstituted urea; and
   2. a cyclic dicarboxylic acid anhydride containing at least one additional functional group capable of condensation or addition selected from the group consisting of cyclic dicarboxylic acid anhydride, carboxylic acid and carboxylic acid ester groups;

at a temperature of from −20° to +450°C in the presence of an organic solvent selected from the group consisting of hydrocarbons, halogenated hydrocarbons, phenols, esters, ketones, ethers, substituted amines, sulfoxides, sulfones and mixtures thereof in which said resulting high molecular weight polyimide contains recurring imide groups, the N-atom of which is derived from the N-atom in a urea group of said urea reactant.

2. The process of claim 1 wherein the reaction is carried out at a temperature of 20° to 350°C.

3. The process of claim 1 wherein said urea comprises the reaction product of a diisocyanate with a diamine, an aminoalcohol or water.

4. The process of claim 1 wherein said urea comprises the reaction product of an isocyanate selected from the group consisting of diphenylmethane-4,4'-diisocyanate and hexamethylene diisocyanate; with an amine selected from the group consisting of 4,4'-diamino diphenylmethane, hexamethylene diamine and a aminoethanol.

5. The process of claim 1 wherein said cyclic dicarboxylic acid anhydride is selected from the group consisting of trimellitic acid anhydride, pyromellitic acid dianhydride and azo-bis-4,4'-phthalic acid anhydride.

* * * * *